United States Patent
Wolf et al.

(10) Patent No.: US 8,786,222 B2
(45) Date of Patent: Jul. 22, 2014

(54) OPEN-LOOP OR CLOSED-LOOP CONTROL METHOD FOR A CONVERTER

(75) Inventors: Harald Wolf, Ubstadt-Weiher (DE); Wolfgang Hammel, Bruchsal (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 774 days.

(21) Appl. No.: 12/995,053

(22) PCT Filed: May 11, 2009

(86) PCT No.: PCT/EP2009/003312
§ 371 (c)(1),
(2), (4) Date: Nov. 29, 2010

(87) PCT Pub. No.: WO2009/152898
PCT Pub. Date: Dec. 23, 2009

(65) Prior Publication Data
US 2011/0068722 A1    Mar. 24, 2011

(30) Foreign Application Priority Data
May 27, 2008 (DE) .......................... 10 2008 025 408

(51) Int. Cl.
*H02P 21/00* (2006.01)

(52) U.S. Cl.
USPC . 318/400.02; 318/571; 318/696; 318/400.09; 318/400.42

(58) Field of Classification Search
USPC ............. 318/400.02, 400.01, 400.09, 400.42, 318/571, 696
See application file for complete search history.

(56) References Cited

U.S. PATENT DOCUMENTS

2004/0151119 A1* 8/2004 Schierling et al. ............ 370/244
2008/0180054 A1* 7/2008 Kinpara et al. ............... 318/720

OTHER PUBLICATIONS

Silva, et al., "*Sensorless vector control of induction machine with low speed capability using MRAS with drift and inverter nonlinearities compensation*," EUROCON 2007, The International Conference on "Computer as a Tool", Sep. 9-12, 2008, pp. 1922-1928.
Silva, et al., "*Hybrid Rotor Position Observer for Wide Speed-Runge Sensorless PM Motor Drives Including Zero Speed*," IEEE Transactions on Industrial Electronics 53(2): 373-378 (2006).

* cited by examiner

*Primary Examiner* — Eduardo Colon Santana
*Assistant Examiner* — Iftekhar Mustafa
(74) *Attorney, Agent, or Firm* — Kenyon & Kenyon LLP

(57) ABSTRACT

An open-loop or closed-loop control method for a converter which supplies an electric motor, wherein a current space vector is acquired as motor current, and the motor voltage, in particular a voltage space vector, is set, an induced voltage space vector $\underline{U}_I$ is determined, which is forwarded to an integration element, a flux space vector being generated, whose angular position is perpendicular to the voltage space vector, the amount of the flux space vector corresponding to a predefined nominal value, the difference of the integration result and the flux space vector thus produced being used as feedback in the integration element.

7 Claims, 2 Drawing Sheets

OPEN-LOOP OR CLOSED-LOOP CONTROL METHOD FOR A CONVERTER

FIELD OF THE INVENTION

The present invention relates to an open-loop or closed-loop control method for a converter.

BACKGROUND INFORMATION

Knowledge of the direction of the flux space vector is an indispensable prerequisite for the dynamic control of a polyphase machine. In the case of a synchronous machine, the direction of the flux space vector has a fixed relationship to the rotor position. That is the reason why position transducers, which measure the position of the rotor relative to the stator and transmit it to the closed-loop control in the converter, are frequently used for controlling the machine. This method is also usable for an asynchronous machine, in that, apart from the measured rotor position, the slip angle is modeled additionally within the closed-loop control and added to the rotor position. Thus, the direction of the flux space vector relative to the stator is known in such a case as well.

A disadvantage of this procedure is the required use of a position transducer because it causes additional expense both for the position transducer, the wiring and the required evaluation in the converter.

In order to be able to dispense with the position transducer, it is therefore necessary to determine the position of the flux space vector from the electrical variables, which are available to the converter anyway.

It is known that the rotor flux vector is able to be determined from the stator voltage and the stator current, in the following manner $$\underline{\Psi}_R = \int (\underline{u}_S - R_S \cdot \underline{i}_S) \cdot dt - L_S \cdot \underline{i}_S$$

That is to say, the time integral of the induced voltage must be calculated. Toward this end, the time integral of the voltage applied at the stator clamps of the motor minus the Ohmic voltage drop at the stator winding must be generated, and the flux component $L_S \cdot \underline{i}_S$ caused by the stator current must subsequently be deducted from the calculated integral.

In this context it is problematic that the integral to be generated constitutes an open integration, in which even very small offsets in the acquisition of the variables to be integrated lead to drift of the integration result, so that the modeling of the flux space vector becomes increasingly false over time.

To avoid this problem, from the publication "Hybrid Rotor Position Observer for Wide Speed-Range Sensorless PM Motor Drives Including Zero Speed", IEEE Transactions on Industrial Electronics, vol. 53, No. 2, April 2006 by C. Silva et al., a flux vector monitoring model is known, which uses feedback to reduce or suppress the drift of the integration element, to which the result of the integration, i.e., the rotor flux space vector, is fed back via a P-element. This prevents drift of the integrator content. However, this method has the disadvantage that, at decreasing rotational speed, the model value of the flux space vector determined in this manner increasingly deviates from the actual flux space vector of the motor. Therefore, the method can only be used in a limited range, i.e., above a given limit frequency. This minimally usable limit frequency depends on the choice of the amplification factor of the feedback, which, however, may not be selected arbitrarily small because the required suppression of drift would otherwise no longer be ensured. The feedback of the integration result, which is required for an effective suppression of the drift, produces a falsification of the monitored flux space vector even when the offsets of the measuring signals themselves vanish.

From the publication:
1. Silva, C; Araya, R.: "Sensorless Vector Control of Induction Machine with Low Speed Capability using MRAS with Drive and Inverter Nonlinearities Compensation" in EUROCON, 2007, The International Conference on "Computer as a Tool", 9-12 Sep. 2008, Pages: 1922-1928 in FIG. 1 in the "flux estimator" box, it is that the amount is generated from the integration result, and that it is compared to the specified nominal value. That is to say, the difference of the two values is calculated in the process. This is a scalar quantity, that is to say, no incremental vector. This scalar differential value is then used to generate a vector whose direction is selected such that it matches the direction of the integration result, i.e., the model value to be formed, the amount of this vector being defined by the above scalar differential value. Then, this vector is used as feedback quantity to back up the model value. The correction of the model value thus always takes place only in the radial direction, that is to say, in a manner that modifies only the amount, but does not correct the angle. Thus, it is obvious that the feedback quantity has no real physical flux space vector of the motor or a differential flux space vector for correcting the model value of the flux space vector, because the direction of the differential flux space vector is determined from the drifting integration result itself and thus is virtually never correct. In the case of the vanishing drift of the integration element, it is true that the fed-back quantity vanishes as well. But if drift is present, the feedback quantity does not stand perpendicular on the motor voltage space vector. As a consequence, the feedback quantity is not parallel to the physical, actual flux space vector of the motor.

SUMMARY

Therefore, example embodiments of the present invention provide an open-loop or closed-loop control method for a converter, in which the closed-loop control is to be improved, in particular, the regulating quantity. According to example embodiments of the present invention, this is achieved by a method that does not cause any falsification of the model flux space vector even at small frequencies.

Among the features in the open-loop or closed-loop control method for a converter supplying an electric motor are that a current space vector is acquired as motor current, and the motor voltage, in particular a voltage space vector, is set,
an induced voltage space vector $\underline{U}_I$ being determined, which is forwarded to an integration element,
feedback being provided at the integration element, such that in the event of vanishing drift of the integration result, the feedback quantity vanishes as well.

It is advantageous that with vanishing drift, i.e., a modeling result that is as correct as possible with regard to the physical, actual values, the feedback vanishes, so that no principle-based deviations are produced. Furthermore, the values of the machine model, which are already known to begin with, including information regarding the direction of rotation, are sufficient as input variables for the method described herein.

Expressed in different terms, among the features in the open-loop or closed-loop control method for a converter supplying an electric motor are that a current space vector is acquired as motor current, and the motor voltage, in particular a voltage space vector, is set,
an induced voltage space vector $\underline{U}_I$ being determined, which is forwarded to an integration element, a flux space vector is generated, whose angular position is perpendicular to the voltage space vector, the amount of the flux space vector corresponding to a predefined nominal value, the difference of the integration result and the flux space vector thus produced being used as feedback in the integration element.

It is advantageous in this context that the feedback does not generate any error as a function of the rotational speed, but that with vanishing feedback, the drift vanishes as well. In addition, it is advantageously also possible to use a quantity that includes a lot of noise as fed-back quantity, which the expert would most likely avoid as a controlled variable. Because of the integration, this noise is smoothed, so to speak, and suppressed, similar to a low-pass filter.

In example embodiments of the present invention, the vectorial difference from a reference flux space vector, which corresponds to the physical flux space vector, and the integration result, i.e., the model flux space vector itself, is therefore used as feedback quantity. The correction of the model value may thus be performed in any direction and therefore has not only an amount-changing but also an angle-correcting effect. Decisive in this context is that the reference flux space vector used according to example embodiments of the present invention matches the actual machine flux space vector very well, since its direction is obtained from the actual machine voltage. At the same time, however, this quantity is obtained without integration and thus is free of drift due to the principle.

In example embodiments, the difference of the integration result and the flux space vector produced in this manner is multiplied by a factor and added to or subtracted from the integrand of the integration element. In this context it is advantageous that it is possible to reduce the effect of the feedback by the factor, and that the drift of the integration element is slowly reduced as a result.

In example embodiments, the amount of the flux space vector is selected as nominal value of the flux applying to the motor, the nominal value of the flux in particular being generated by the magnetization produced by the permanent magnets provided on the rotor in the implementation of the electric motor as synchronous motor, and corresponding to the magnetized value of the flux in the implementation of the electric motor as asynchronous motor. In this context it is advantageous that it is possible to use the value known from the motor data, which therefore allows the reference flux space vector to be determined in a simple manner.

In example embodiments, the angular position of the generated flux space vector is selected as a function of the direction of rotation, +90° or −90° relative to the angular position of the integrand, i.e., the induced voltage space vector. It is advantageous in this context that the physics of the machine are able to be simulated in idealized manner, i.e., easily and rapidly, and also with little computational effort.

In example embodiments, the space vectors lie in a plane whose normal is aligned in the axial direction. In this context, the low computational effort is advantageous.

In example embodiments, the integrand as induced voltage is $$\underline{U}_I = \underline{U}_S - R_S \cdot \underline{I}_S - L_S \cdot \frac{d\underline{I}_S}{dt}.$$

In this context it is advantageous that a known machine model is able to be used for the asynchronous motor and also the synchronous motor.

In example embodiments, when the drift of the integration result vanishes, the feedback quantity vanishes as well. In this context it is advantageous that no speed-dependent error that increases with dropping speed is present.

Figure 1:
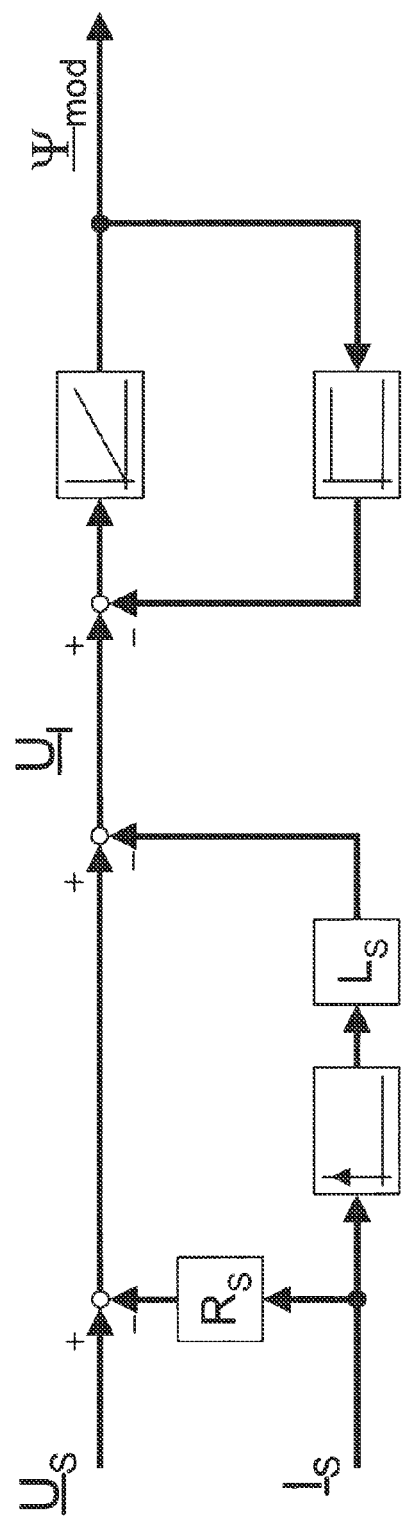
FIG. 1 illustrates the method according to an example embodiment of the present invention.

LIST OF REFERENCE CHARACTERS $\underline{U}_I$ induced voltage space vector
$\phi_{ref}$ angular position of the induced voltage space vector
$\underline{\Psi}_{ref}$ comparison value for the flux space vector, reference flux space vector
$\Psi_{Nenn}$ nominal value of the flux
$\underline{\Psi}_{mod}$ model value of the flux space vector

DETAILED DESCRIPTION

Example embodiments of the present invention will now be explained in more detail with reference to the figures.

The converter includes a rectifier supplied from the one-phased or three-phased network, whose unipolar output voltage is forwarded to a smoothing capacitor, the so-called intermediate circuit capacitor, from which three half-bridges, made up of power switches, are supplied as output stage. Each half-bridge includes a series connection of at least two power switches, each of which is triggered in pulse-width-modulated manner. The control signals for the switches are generated in an electronic circuit, that is to say, signal electronics, in particular, which are connected to devices for detecting the motor current, i.e., a current space vector.

Toward this end, the currents in the three phasing lines supplying the motor are recorded or, alternatively, the current flowing in a half-bridge is recorded with the aid of one or more shunt resistors. To set the motor voltage, i.e., a voltage space vector, it is sufficient to record the instantaneous value of the intermediate circuit voltage; the voltage space vector, i.e., the motor voltage, being controllable via a particular pulse width. As a result, by setting the pulse width while taking the intermediate circuit voltage into account, it is possible to use the motor voltage as actuating variable.

In signal electronics, a control process is implemented, model values of the electric motor supplied from the converter being determined, especially also the stator flux as model value.

$$\underline{U}_I = \underline{U}_S - R_S \cdot \underline{I}_S - L_S \cdot \frac{d\underline{I}_S}{dt}$$

formed, this result being integrated in order to calculate flux Psi_mod. In so doing, feedback is taken into account in order to reduce the drift of the integration element, which subtracts a flux that is proportional to the result of the integration element from the input of the integration element.

Figure 2:
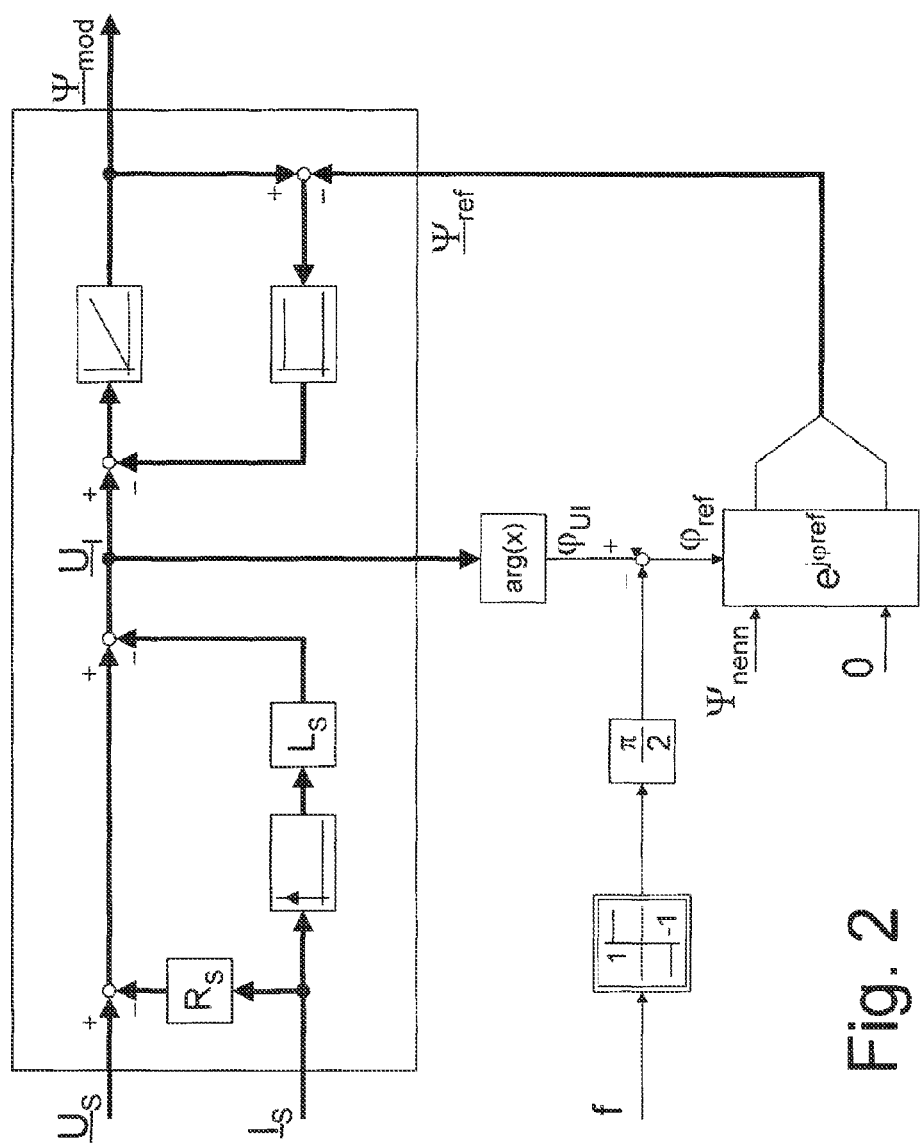
FIG. 2 illustrates the method according to an example embodiment of the present invention.

FIG. 2 shows a further development to FIG. 1. Depending on the algebraic sign of the rotational speed, i.e., as a function of the direction of rotation, $$\frac{\pi}{2}$$

is added to or subtracted from the value of the argument of integrand $\underline{U}_I$, that is to say, from the angular position of the induced voltage space vector. The result of this operation is an angle $\phi_{ref}$ for which a flux space vector $\underline{\Psi}_{ref}$ is generated, whose length is specified as the nominal value of the flux that applies to the motor, and whose angular position corresponds to angular position $\underline{\Psi}_{ref}$. When the electric motor is implemented as synchronous motor, this nominal value is known via the permanent magnets situated on the rotor. When the electric motor is implemented as asynchronous motor, this nominal value is achieved following the magnetization of the rotor; deviations from this value are present only for the duration of the magnetization or during other extremely dynamic processes.

The coordinate representation in a rotor-flux-oriented coordinate system is shown in FIG. 2 with the components $\Psi_{Nenn}$ and 0. The space vector of the flux is then represented in a stator-oriented coordinate system, however, and the two associated components are used as feedback quantity in order to reduce the drift of the integration element. In this context it is important that the difference between flux space vector $\underline{\Psi}_{ref}$ and the output of the integration element is generated and, multiplied by a factor, is transmitted to the input of the integration element, that is to say, is subtracted from the integrand.

An advantage of example embodiments of the present invention in this regard is that the feedback quantity vanishes exactly when no drift of the integration element is present. In this manner, the feedback variable does not generate any faulty deviation in the integration result, in particular no speed-dependent error quantity.

However, if the integration result is fed back via a transmission element such as a P-element, as it is done in certain conventional arrangements, then an error of flux $\underline{\Psi}_{mod}$ in its phase would result, which would become greater as the frequencies become smaller. Thus, the modeled quantity of the flow space vector corresponds less and less to the actual physical quantity of the flux space vector in the motor when the frequencies become smaller.

In example embodiments of the present invention, the quantity fed back to the integration input is advantageously obtained from a comparison between the integrated model flux $\underline{\Psi}_{mod}$ and a reference flux $\underline{\Psi}_{ref}$ the reference flux not being subject to drift due to the principle. Furthermore, the reference flux is determined from quantities that are available anyway. With regard to its nature, this reference flux corresponds to the actual flux space vector in the machine, so that the feedback of the difference between the integrated model flux space vector and the reference flux space vector has no falsifying influence on the integrated model flux. This also applies when the frequency becomes very small.

Thus, a greater rotational speed range, in particular in the direction of smaller speeds, is able to be used, since even at the smallest frequencies substantially correct angular position of the flux space vector is determined.

In this document, "perpendicular" also denotes angles that deviate slightly from 90°. The larger the deviation, the larger the current that is required for a demanded torque.

The invention claimed is:

1. An open-loop or closed-loop control method for a converter which supplies an electric motor, comprising:
    acquiring a current space vector as a motor current;
    setting at least one of (a) a motor voltage and (b) a voltage space vector;
    determining an induced voltage space vector;
    forwarding the induced voltage space vector to an integration element;
    generating a flux space vector having an angular position perpendicular to the voltage space vector, an amount of the flux space vector corresponding to a predefined nominal value; and
    using a difference of an integration result and the flux space vector generated as feedback in the integration element;
    wherein the integrand encompasses $$\underline{U}_I = \underline{U}_S - R_S \cdot \underline{I}_S - L_S \cdot \frac{d\underline{I}_S}{dt};$$

wherein:
    $U_I$ is an induced voltage space vector;
    $U_S$-$R_S$ is a voltage drop at a stator winding; and
    $I_S$-$L_S$ is a flux component caused b stator current.

2. The method according to claim 1, wherein with vanishing drift of the integration result, a feedback quantity vanishes.

3. The method according to claim 1, wherein the difference of the integration result and the flux space vector generated is multiplied by a factor and one of (a) added to and (b) subtracted from an integrand of the integration element.

4. The method according to claim 1, wherein the amount of the flux space vector is selected as at least one of (a) a nominal value of flux applying to the motor and (b) a nominal value of flux being generated by a magnetization produced by permanent magnets provided on a rotor in an electric motor as an synchronous motor, and corresponding to a magnetized value of the flux in the electric motor as the asynchronous motor.

5. The method according to claim 1, wherein the angular position of the generated flux space vector is selected as a function of at least one of (a) a direction of rotation, leading or reactive to the angular position of the integrand and (b) a direction of rotation, +90° or −90° with respect to the angular position of the integrand.

6. The method according to claim 1, wherein the space vectors lie in a plane having a normal aligned in an axial direction.

7. The method according to claim 4, wherein the nominal value of the flux is selected to correspond to a flux specification used in regulation of the converter.

* * * * *